United States Patent
Sage-Umana et al.

(10) Patent No.: US 8,082,806 B2
(45) Date of Patent: Dec. 27, 2011

(54) PASSIVE DETECTION SYSTEMS AND METHODS

(75) Inventors: Maria C. Sage-Umana, Clearwater, FL (US); Manuel I. Rodriguez, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 182 days.

(21) Appl. No.: 12/428,380

(22) Filed: Apr. 22, 2009

(65) Prior Publication Data

US 2010/0269597 A1    Oct. 28, 2010

(51) Int. Cl.
*G01L 1/00* (2006.01)

(52) U.S. Cl. .................................................. 73/862.53

(58) Field of Classification Search ................. 73/862.53
See application file for complete search history.

(56) References Cited

U.S. PATENT DOCUMENTS

| | | | |
|---|---|---|---|
| 3,024,647 A * | 3/1962 | Merriman | 73/862.53 |
| 3,077,178 A * | 2/1963 | Gordon | 116/212 |
| 3,136,154 A * | 6/1964 | Christensen | 73/787 |
| 3,853,546 A * | 12/1974 | Werner et al. | 73/862.53 |
| 4,974,451 A * | 12/1990 | DeTeresa | 73/821 |
| 5,528,151 A * | 6/1996 | Perez | 324/525 |
| 6,983,660 B2 * | 1/2006 | Kwon | 73/806 |
| 7,360,437 B2 * | 4/2008 | Hardwicke et al. | 73/763 |
| 7,424,996 B2 * | 9/2008 | Larsen et al. | 254/243 |
| 7,607,401 B2 * | 10/2009 | McCauley | 116/212 |
| 7,621,190 B2 * | 11/2009 | Ahmad et al. | 73/862.474 |
| 2006/0288794 A1 * | 12/2006 | Hardwicke et al. | 73/763 |
| 2009/0205444 A1 * | 8/2009 | Zadesky et al. | 73/862.625 |
| 2010/0095786 A1 * | 4/2010 | Imholt et al. | 73/862.68 |

* cited by examiner

*Primary Examiner* — Freddie Kirkland, III
(74) *Attorney, Agent, or Firm* — Lowe Graham Jones PLLC

(57) ABSTRACT

Systems and methods for passively determining when a threshold force has been exceeded. An example apparatus includes a housing and a substrate that is attached at one end to an interior portion of the housing. The substrate includes at least one conductive trace, each having two ends. The substrate is configured to fail when the threshold force has been experienced. The metal trace ends are electrically accessible from an exterior side of the housing. Prior to delivery, the housing is connected to a package that includes one or more force sensitive devices. Upon arrival of the package, the at least one conductive trace is electrically tested to determined if the substrate has failed. If the substrate has failed the package has experienced a force greater than the threshold force.

17 Claims, 4 Drawing Sheets

PASSIVE DETECTION SYSTEMS AND METHODS

BACKGROUND OF THE INVENTION

Electronic (sensor) equipment can be damaged if the vibration on a particular axis exceeds a threshold amount. This damage can occur even if the electronic equipment is powered off (such as while being transported). Electronic monitoring of vibration for extended periods of time requires at a minimum a power source and a means to store the maximum vibration value detected, both of which can be impractical for many applications.

SUMMARY OF THE INVENTION

The present invention provides systems and methods that passively determine when a threshold force has been exceeded. An example apparatus includes a housing and a substrate, such as glass, that is attached at one end to an interior portion of the housing. The substrate includes at least one conductive trace, each having two ends. The substrate is configured to fail (i.e., break or crack) when the threshold force has been experienced. The metal trace ends are electrically accessible from an exterior side of the housing.

At the start of passive monitoring or prior to delivery, the housing is connected to a package or container that includes one or more force sensitive devices. At the end of the passive monitoring or upon arrival of the package, the at least one conductive trace is electrically tested to determined if the substrate has failed. If the substrate has failed the package or container has experienced a force greater than the threshold force.

BRIEF DESCRIPTION OF THE DRAWINGS

Preferred and alternative embodiments of the present invention are described in detail below with reference to the following drawings:

FIG. 1-2 illustrates a cross-section of the formed packaged device shown in FIG. 1;

FIG. 2 illustrates a cross-section of the packaged device shown in FIG. 1;

DETAILED DESCRIPTION OF THE INVENTION

Figure 1:
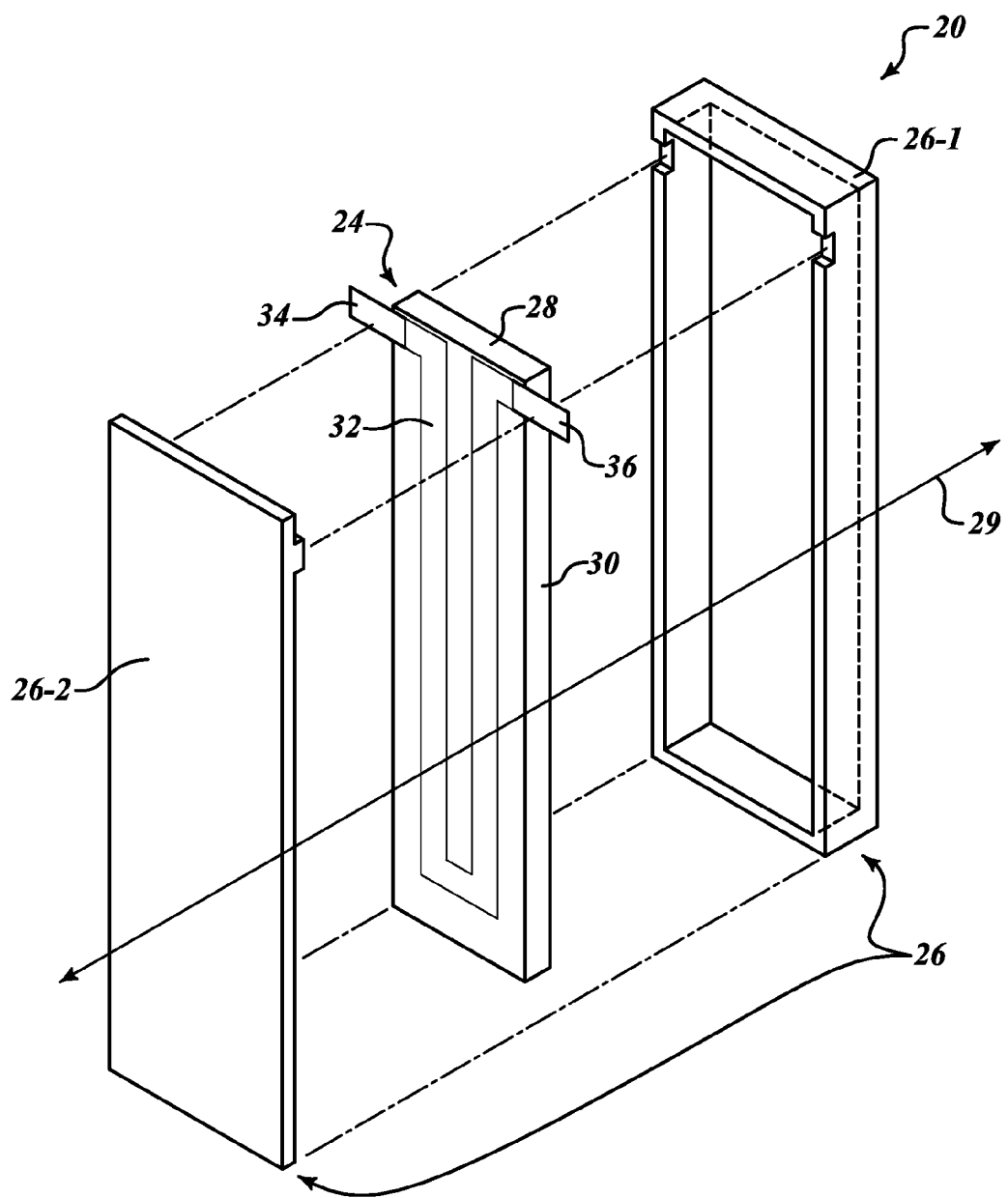
FIG. 1-1 illustrates an exploded, perspective view of an example passive vibration sensor formed in accordance with the embodiment of the present invention.

FIG. 1-1 illustrates a blown-up, perspective view of a passive vibration detection device 20. The device 20 includes a core glass structure 24 encased within a housing 26. The core glass structure 24 is attached only at or near a top edge 28 to a corresponding inside surface(s) of the housing 26. The glass structure 24 glass is glued (e.g., epoxy or silicon within the housing 26.

The core glass structure 24 is suspended in such a manner that the structure 24 can move along a sense axis 29 that is perpendicular to a major surface of the structure 24. The housing 26 is sized to allow any motion of the core glass structure 24 along the sense axis 29. The core glass structure 24 is primarily formed of a glass substrate 30. On a first (major) surface of the glass substrate 30 is applied a metal trace 32. In this embodiment, the metal trace 32 is a U-shape pattern of metal that begins at one edge of the structure 24 near the top edge 28 and proceeds down one side of the first surface and back up another side of the first surface. Metallic leads 34 and 36 are attached (via a solder connection) to respective ends of the U-shaped metallic trace 32. The leads 34 and 36 extend through the housing 26 (FIG. 2).

Figures 1, 2:
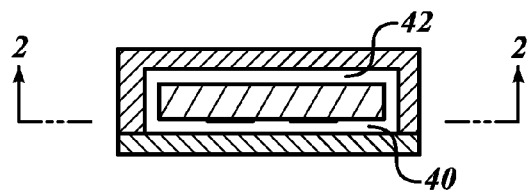
Figure 2:
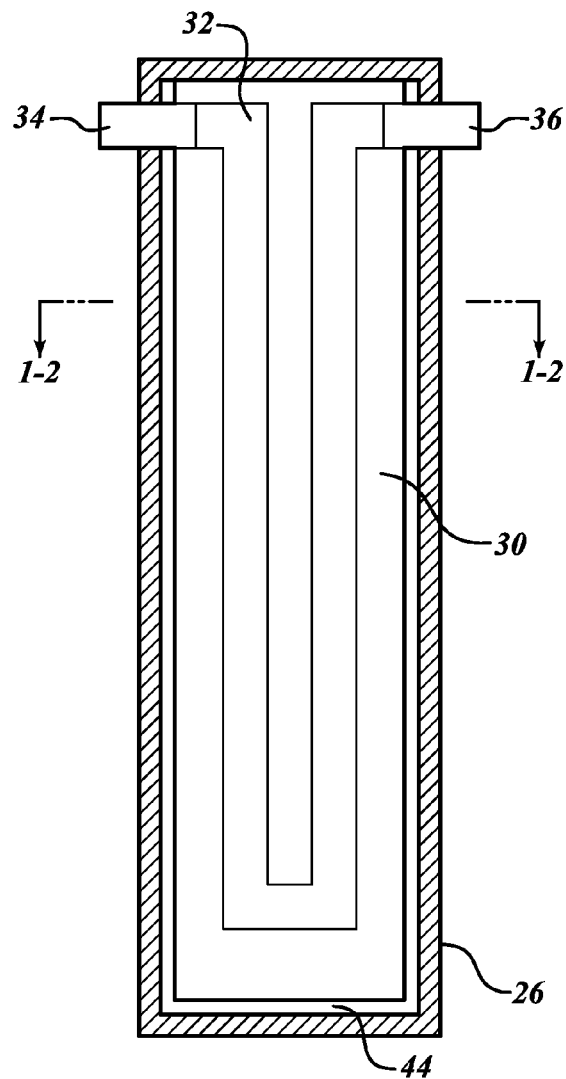

FIGS. 1-2 and 2 show gaps 40, 42, and 44 located between the glass substrate 30 and the housing 30. The gaps 40, 42, and 44 allow the glass substrate 30 to experience vibration forces with the housing 30.

The housing 26 includes a base cavity section 26-1 and a cover section 26-2. The leads 34 and 36 pass through a slot provided in the sections 26-1 or 26-2 or through a slot formed between the sections 26-1 and 26-2 as formed by cutouts.

The glass substrate 30 is manufactured from a flat piece of glass of known mechanical dimensions and mechanical properties (such as the coefficient of expansion). The mechanical properties of the glass substrate 30 and the metal trace 32 are selected in such manner that vibration of the glass substrate 30 in excess of a predefined vibration threshold along the sense axis 29 would cause partial or total failure of the glass substrate 30. Failure might include a crack or total breakage of the glass substrate 30. Other materials comparable to the glass substrate 30 can be used, such as a ceramic.

Multiple ones of the devices 20 can be mounted in or on electronic equipment and oriented according to predefined sense axes of interest. The exposed electrical leads 34 and 36 allow one to easily test the integrity of the U-shaped trace 32 in order to determine if failure or over vibration of the glass substrate 30 has occurred. One can attach a circuit test device (not shown) to the leads 34 and 36 in order to test the integrity of the metal trace 32.

In one embodiment, the housing 26 is sealed to prevent external materials from damaging the glass substrate 30. The housing 26 also will contain shattered components of the glass substrate 30, if failure occurs.

Figure 3:
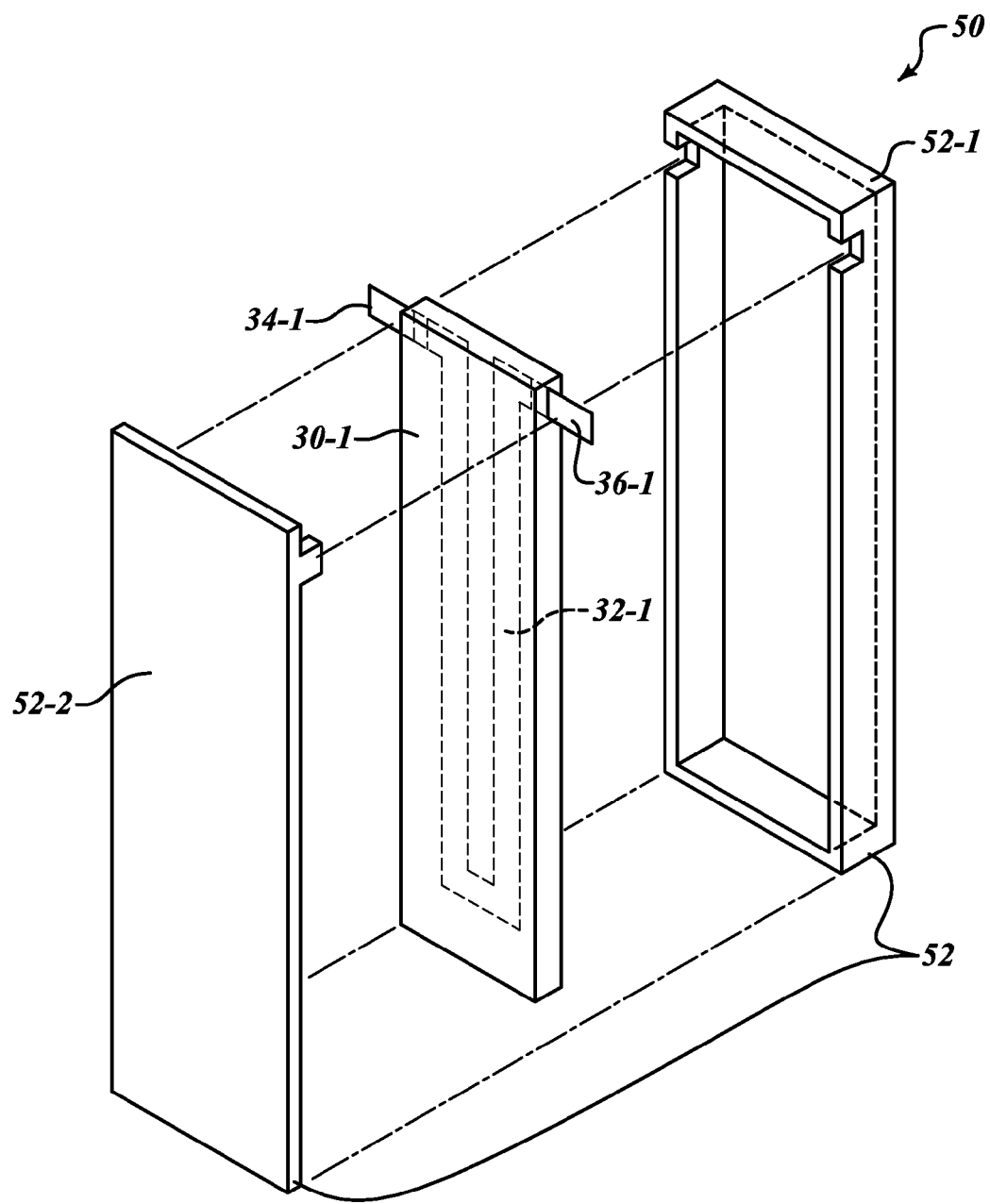
FIG. 3 illustrates a blown-up, perspective view of an alternate embodiment of the present invention.

FIG. 3 illustrates a sensor device 50 formed in accordance with an alternate embodiment of the present invention. The device 50 includes a glass substrate 30-1 having a U-shaped metallic trace 32-1 that is formed within the glass substrate 30-1 and leads 34-1 and 36-1 that are formed partially within the glass substrate 30-1. The glass substrate 30-1 is attached within a housing 52 that includes a cover 52-2 and a base section 52-1 similar matter to that described in FIG. 1.

The leads 34-1 and 36-1 are preferably the same material as trace 32-1 and could be extensions of the trace 32-1. Forming this embodiment is done by placing the trace 32-1 (and the leads 34-1 and 36-1) in a mold, inserting molten glass, then letting the glass cool and solidify around the trace 32-1 and the leads 34-1 and 36-1.

Figure 4:
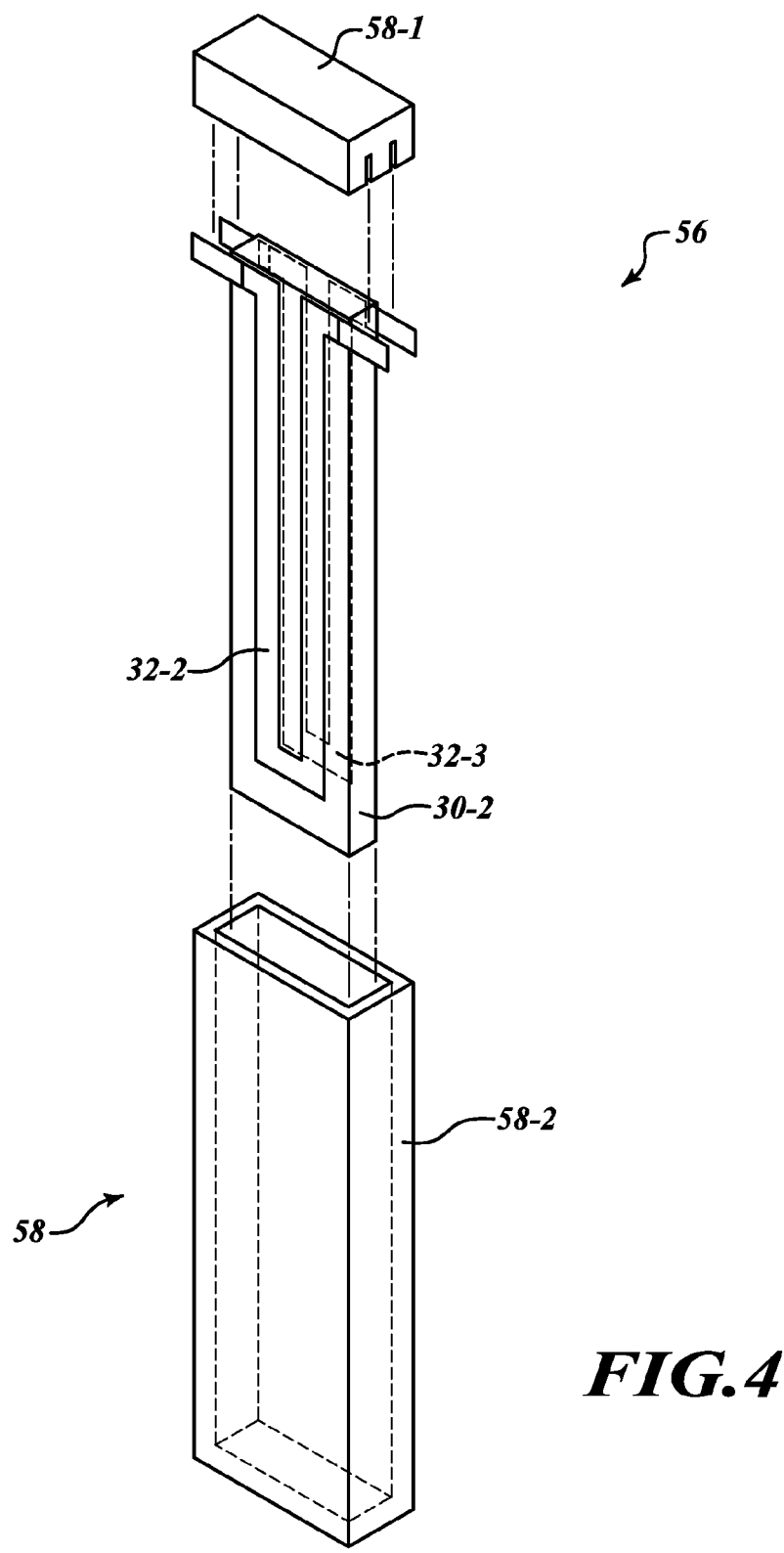
FIG. 4 illustrates a blown-up, perspective view of another embodiment of the present invention.

FIG. 4 illustrates still another embodiment of a sensor device 56 where a glass substrate 30-2 includes a first U-shaped metal trace 32-2 formed on a first side of the glass substrate 30-2 and a second U-shaped metal trace 32-3 formed on an opposing side of the glass substrate 30-2. In this embodiment, the glass substrate 30-2 is attached to a cap 58-1 of a housing structure 58. Then, the cap 58-1 is attached to a base portion 58-2, thereby causing the glass substrate 30-2 to suspend within a cavity of the base portion 58-2. The cap 58-1 includes grooves, slots or even metallic traces for allowing connection of the U-shaped traces 32-2 and 32-3 to or beyond an external surface of the housing structure 58.

While the preferred embodiment of the invention has been illustrated and described, as noted above, many changes can be made without departing from the spirit and scope of the invention. For example, the metal trace(s) applied to the glass substrate may be any shape (e.g., diagonal or straight) provided they are able to fail when the substrate fails. Also, materials with similar breakage properties to glass may be used for the substrate material. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus comprising:
    a cavity completely surrounded by a housing; and
    a substrate attached at one end to an interior portion of the housing inside the cavity, the substrate comprising at least one conductive trace, each having two ends,
    wherein the substrate is configured to fail when a threshold force has been experienced,
    wherein the metal trace ends are electrically accessible from an exterior side of the housing.

2. The apparatus of claim 1, wherein the housing is sealed.

3. The apparatus of claim 1, wherein the substrate comprises two leads, each attached to one of the two ends.

4. The apparatus of claim 3, wherein the leads extend through the housing.

5. The apparatus of claim 1, wherein the at least one conductive trace is U-shaped.

6. The apparatus of claim 1, wherein the at least one conductive trace is located on only one side of the substrate.

7. The apparatus of claim 1, wherein the at least one conductive trace comprises two traces, each attached to opposing sides of the substrate.

8. The apparatus of claim 1, wherein the substrate comprises glass.

9. The apparatus of claim 1, wherein the at least one conductive trace is located internal to the substrate.

10. A method for passively determining when a threshold force has been exceeded, the method comprising:
    suspending a substrate within a cavity completely surrounded by a housing, the substrate comprises at least one conductive trace, each having two ends, the substrate configured to fail upon experiencing a force above the threshold force;
    connecting the housing to a package comprising one or more force sensitive devices;
    determining if the at least one conductive trace conducts a signal; and
    determining the threshold force has been exceeded if the at least one conductive trace does not conduct the signal.

11. The method of claim 10, wherein the at least one conductive trace is U-shaped.

12. The method of claim 10, wherein the at least one conductive trace is located on only one side of the substrate.

13. The method of claim 10, wherein the at least one conductive trace comprises two traces, each attached to opposing sides of the substrate.

14. A system for passively determining when a threshold force has been exceeded, the system comprising:
    a means for suspending a substrate within a cavity completely surrounded by a housing, the substrate comprises at least one conductive trace, each having two ends, the substrate configured to fail upon experiencing a force above the threshold force;
    a means for connecting the housing to a package comprising one or more force sensitive devices;
    a means for determining if the at least one conductive trace conducts a signal; and
    a means for determining the threshold force has been exceeded if the at least one conductive trace does not conduct the signal.

15. The system of claim 14, wherein the at least one conductive trace is U-shaped.

16. The system of claim 14, wherein the at least one conductive trace is located on only one side of the substrate.

17. The system of claim 14, wherein the at least one conductive trace comprises two traces, each attached to opposing sides of the substrate.

* * * * *